United States Patent [19]

Cornwall

[11] Patent Number: 4,953,235
[45] Date of Patent: Sep. 4, 1990

[54] TRAP FITTING ASSEMBLY

[76] Inventor: Kenneth R. Cornwall, 4963 Springfield Dr., Dunwoody, Ga. 30338

[21] Appl. No.: 205,360

[22] Filed: Jun. 10, 1988

[51] Int. Cl.$^5$ .............................. E03C 1/284
[52] U.S. Cl. ...................... 4/191; 4/252 R; 285/64; 137/362; 137/247.11
[58] Field of Search ............... 4/191, 252 R, 584; 285/64, 422; 137/362, 247, 247.11, 247.13

[56] References Cited

U.S. PATENT DOCUMENTS

| | | | |
|---|---|---|---|
| 1,109,740 | 9/1914 | Dehn | 137/362 |
| 1,143,946 | 6/1915 | Covert | 137/362 |
| 2,478,976 | 8/1949 | Modlin | 137/362 |
| 3,504,383 | 4/1970 | Young | 4/191 |
| 3,643,267 | 2/1972 | Winter | 4/252 |
| 4,224,702 | 9/1980 | Bretone, Jr. | 4/252 R |
| 4,261,598 | 4/1981 | Cornwall | 285/56 |
| 4,338,688 | 7/1982 | Petty | 4/191 |
| 4,420,176 | 12/1983 | Cornwall | 285/158 |
| 4,518,177 | 5/1985 | Deakins | 285/64 |
| 4,574,402 | 8/1986 | Brown, Sr. | 4/252 R |
| 4,619,087 | 10/1986 | Harbeke | 285/64 |
| 4,623,170 | 11/1986 | Cornwall | 285/4 |
| 4,724,858 | 2/1988 | Cornwall | 137/75 |

*Primary Examiner*—Henry J. Recla
*Assistant Examiner*—Edward C. Donovan
*Attorney, Agent, or Firm*—Ian C. McLeod

[57] ABSTRACT

An improved trap fitting assembly ($F_1$, $F_2$) which prevents the spread of fire and smoke through a floor (100,200) of a building is described. The fitting uses a flammable coupling (10, 30) and a non-flammable sleeve (14, 32) inside the coupling with an extension (14b; 32b) from a lower most portion of the floor which is connected to a non-flammable J-pipe (16, 34). In use the J-pipe contains water (101, 201) at a level (L-L) prevents the fire and smoke from going through the floor. The trap fitting is preferably adapted for a floor drain outlet (11) or tub (203).

18 Claims, 2 Drawing Sheets

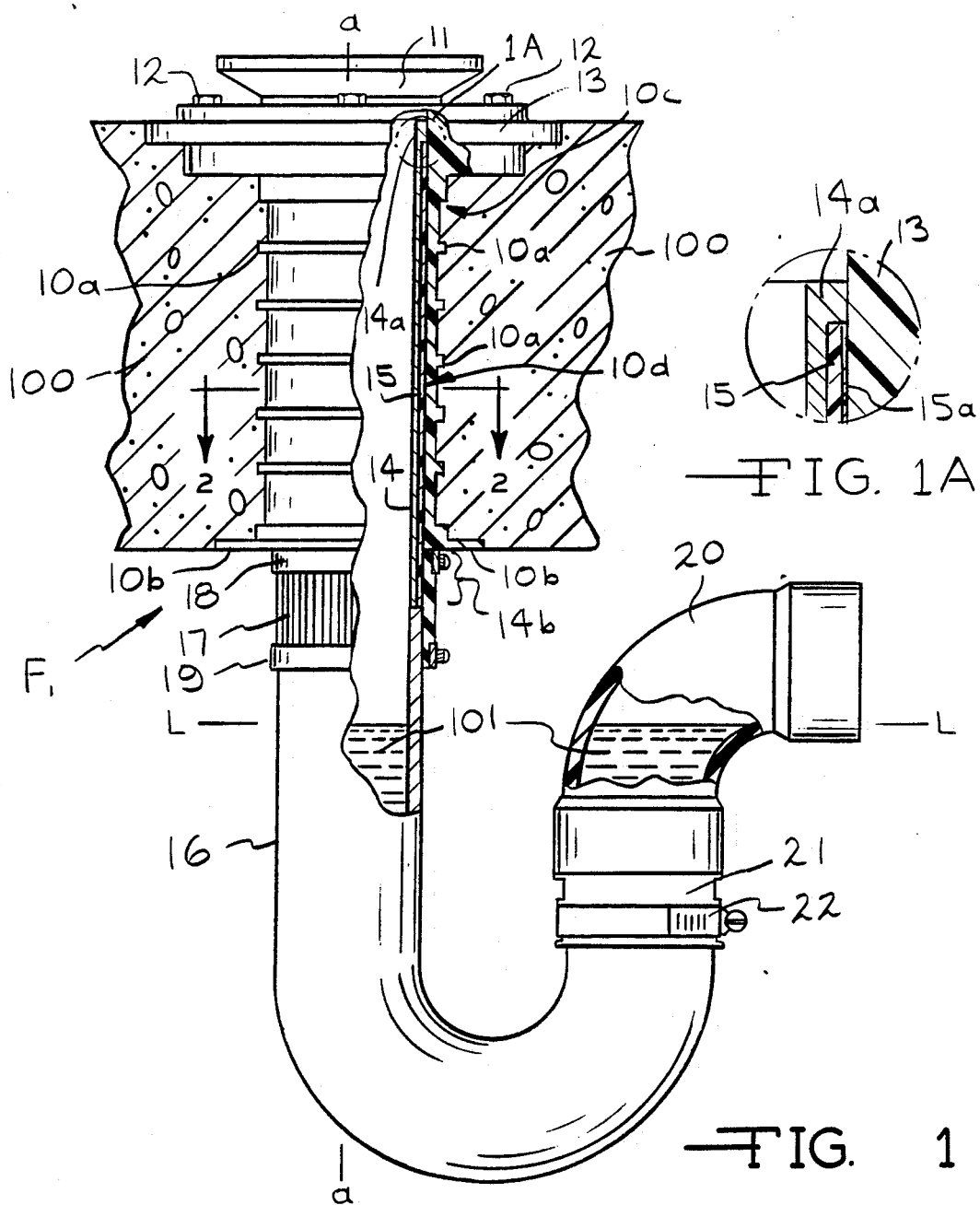
FIG. 1A
FIG. 1
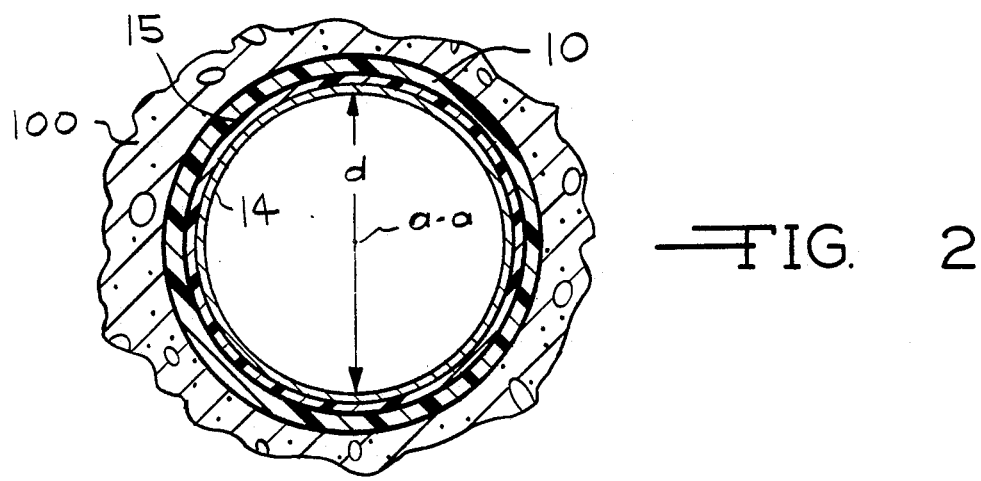
FIG. 2

U.S. Patent    Sep. 4, 1990    Sheet 2 of 2    4,953,235
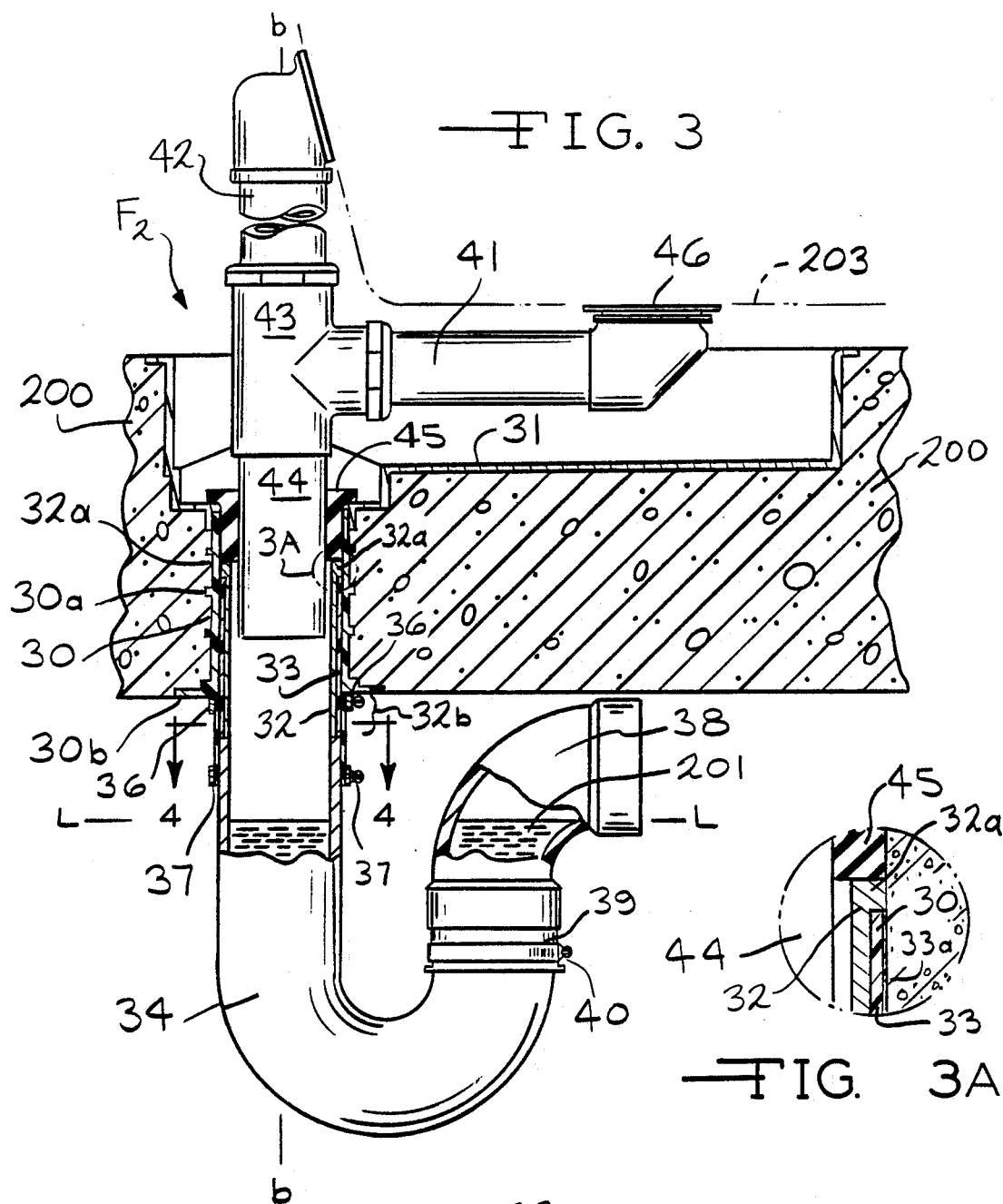
FIG. 3
FIG. 3A
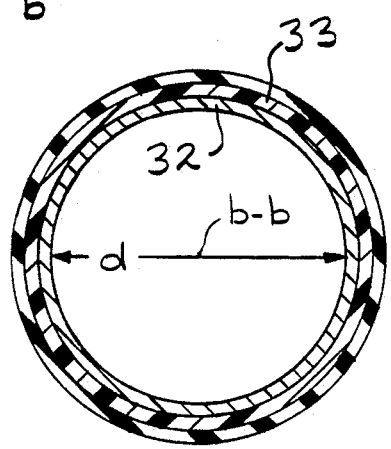
FIG. 4

TRAP FITTING ASSEMBLY

BACKGROUND OF THE INVENTION

(1) Field of the Invention

The present invention relates to an improved trap fitting assembly which prevents smoke and fire from spreading through the fitting mounted through a floor of a building. In particular, the present invention relates to a trap fitting assembly including a flammable tubular coupling mounted through the floor with a non-flammable sleeve mounted inside the coupling and with a non-flammable J-pipe connected to an extension of the sleeve so that water is trapped in the J-pipe.

(2) Prior Art

Trap fitting assemblies are well known and generally include a non-flammable main conduit which penetrates the floor along a vertical longitudinal axis and a non-flammable J-pipe which is connected to a lower most end of the main conduit. Generally the pipe is provided through a pre-formed opening in the floor which is larger in diameter than the conduit and the pipe is held in place by the structure of a drain or a tub box mounted on or in the floor. The problem is that this construction is expensive and smoke and fire can penetrate between the main conduit and the opening.

OBJECTS

It is therefore an object of the present invention to provide an improved trap fitting assembly and a building incorporating the trap fitting assembly wherein smoke and fire are prevented from moving through the floor by the fitting. Further, it is an object of the present invention to provide a fitting assembly which is self-supporting in the floor. These and other objects will become increasingly apparent by reference to the following description and the drawings.

IN THE DRAWINGS

FIG. 1 is a front partial sectional view of a preferred trap fitting assembly of the present invention adapted as a floor drain outlet, such as for a shower stall drain, particularly illustrating a flammable coupling and a non-flammable sleeve mounted inside the coupling and with an extension from the coupling below the floor and a non-flammable J-pipe mounted on the extension of the sleeve, wherein water retained in the J-pipe in use prevents smoke and fire from penetrating through the floor from below the floor. FIG. 1A is an enlarged section of FIG. 1 showing the sleeve and a spacer holding the sleeve in the coupling.

FIG. 2 is a cross-section along line 2—2 of FIG. 1 particularly illustrating the preferred mounting of the sleeve by a spacer tube in the coupling.

FIG. 3 is a front partial sectional view of another preferred trap fitting assembly adapted for bathtub mounting showing a coupling, sleeve and J-pipe similar to FIGS. 1 and 2 and particularly illustrating the mounting of a common pipe for an overflow pipe and a drain pipe in a tub box. FIG. 3A is an enlarged section of FIG. 3 showing a non-flammable sleeve and a spacer holding the sleeve in place in the coupling.

FIG. 4 is a cross-section along line 4—4 of FIG. 3, particularly illustrating a preferred flexible joint holding opposed ends of the J-pipe and extension together.

GENERAL DESCRIPTION

The present invention relates to an improved trap fitting assembly which prevents the spread of fire and smoke through a floor of a building through the fitting assembly which comprises: a flammable tubular coupling means having opposed ends which provides an opening along a longitudinal axis through the floor with an outside wall secured to the floor and an inside wall which defines the opening; a non-flammable sleeve means with openings at opposed ends mounted on the inside of the coupling means between an upper and a lower level of the floor and with an extension below the lower level of the floor; and a non-flammable J-pipe means removably secured to the extension at a lower most of the openings of the sleeve means by a connection means, wherein in use the J-pipe means is filled with water in a lower portion of the J-pipe means thereby preventing smoke and fire from below the floor from moving up through the coupling means and sleeve means to above the floor.

The present invention further relates to a building construction which prevents the spread of fires and smoke through a floor of the building which comprises: an improved trap fitting assembly which prevents the spread of fire and smoke through a floor of a building through the fitting assembly which comprises a flammable tubular coupling means having opposed ends which provides an opening along a longitudinal axis through the floor with an outside wall secured to the floor and an inside wall which defines the opening; a non-flammable sleeve means with openings at opposed ends mounted on the inside of the coupling means between an upper and a lower level of the floor and with an extension below the lower level of the floor; and a non-flammable J-pipe means removably secured to the extension at a lower most of the openings of the sleeve means by a connection means, wherein in use the J-pipe means is filled with water in a lower portion of the J-pipe means thereby preventing smoke and fire from below the floor from moving up through the coupling means and sleeve means to above the floor; a floor mounting the coupling means of the fitting assembly through the floor; and a drain pipe connected to the J-pipe means to convey the water overflowing from the J-pipe means through the building.

The trap fitting assembly is preferably mounts a floor drain or a tub drain. Other types of fitting assemblies for fluid draining through a floor can be used.

In my U.S. Pat. No. 4,724,858, I described a firestop stack fitting for sealing the opening of pipes which extend between floors of a building. A non-flammable sleeve is mounted inside a flammable coupling. This fitting works well where a trap is not required.

SPECIFIC DESCRIPTION

FIGS. 1, 1A and 2 show an improved trap fitting assembly F₁ of the present invention. A flammable coupling 10 is embodied in a concrete floor 100 of a building along vertical axis a—a and held in place by concentric rings 10a around the outside of the coupling 10. A flange 10b serves to mount the coupling 10 on a temporary form (not shown) for pouring the concrete floor 100. This type of coupling is described in my U.S. Pat. Nos. 4,261,598 and 4,623,170. My U.S. patent application Ser. No.88,376. filed Aug. 14, 1987 shows flammable coupling which press fits into a cored opening in the floor with an adhesive which can also be used.

A conventional drain fitting 11 is secured by means of a flange 11a and bolts 12 to a connector 13 embedded in the concrete floor 100. The connector 13 is mounted above an uppermost end 10c of the coupling 10. A non-flammable sleeve 14 is mounted inside the coupling 10 adjacent an inner wall 10d. The sleeve 14 has an integral ring 14a, preferably at its uppermost end, which is the same diameter (d) as the coupling 10. A flammable spacer tube 15 is secured to the coupling 10 as by an adhesive or solvent welding (15a) so that the sleeve 14 is firmly held in place in the coupling 10. The sleeve 14 has an extension 14b which extends below the floor 100. Optionally the spacer tube 15 can also extend below the floor 100 on the extension 14b. A non-flammable J-pipe 16 is connected to the opening in the extension 14b by means of a flexible joint 17 (such as described in U.S. Pat. No. 4,420,176) and held in place by champs 18 and 19. A flammable elbow 20 is preferably connected to the J-pipe 16 by a second flexible joint 21 which is solvent welded inside the coupling 20 and held in place on J-pipe 16 by means of a clamp 22.

Various conventional connection means can be used to secure the J-pipe 16 to the extension 14b and to the elbow 20. As can be seen from FIG. 1, a water 101 level L—L is maintained in the J-pipe 16 to prevent the spread of smoke and fire from below the floor 100 to above the floor 100.

FIGS. 3, 3A and 4 show a trap fitting assembly $F_2$ coupling 30 with rings 30a and flange 30b mounted along vertical axis b—b in a concrete floor 200 of a building, in the manner of the trap fitting assembly $F_1$ of FIGS. 1 and 2, with a tub box 31 mounted at an upper end of the coupling 30. A non-flammable sleeve 32 with ring 32a is mounted inside the coupling 30 by spacer tube 33 which is held in place by an adhesive or solvent welding 33a to the coupling 30. The J-pipe 34 is mounted at an opening of the extension 32b by joint 35 and clamps 36 and 37. Elbow 38 is secured to J-pipe 34 by second joint 39 and clamp 40 as in FIGS. 1 and 2.

The tub box 31 houses drain pipe 41 and overflow pipe 42 through T connector 43 and a common conduit 44. The common conduit 44 is mounted through a flexible connector 45 leading into the coupling 30 to provide a fluid and smoke-tight seal. As can be seen from FIG. 3, the drain pipe 41 is recessed into the tub box 31 so that the bathtub 203 will mount properly with the tub drain 46 at the proper level As can be seen the water 201 level L—L is such that the J-pipe prevents fire and smoke from going through the floor 200.

Numerous variations will occur to those skilled in the art. It is intended that the foregoing description be only illustrative of the present invention and that the present invention be limited only by the hereinafter appended claims.

I claim:

1. An improved trap fitting assembly which prevents the spread of fire and smoke through a floor of a building through the fitting assembly which comprises:
   (a) a flammable tubuler coupling means having opposed ends which provides an opening along a longitudinal axis through the floor with an outside wall secured to the floor and an inside wall which defines the opening;
   (b) a non-flammable, thin sleeve means with openings at opposed ends mounted on the inside of the coupling means along the axis between an upper and a lower plane of the floor and with an extension below the lower plane of the floor with a thickness between inner and outer walls of the sleeve means less than the thickness between the walls of the coupling means, wherein the sleeve means has an enlarged ring above an elongate cylindrical portion on an outside wall around the longitudinal axis of the coupling means and wherein a thin flammable spacer tube means is mounted on the inside wall of the coupling means and on the elongate cylindrical portion of the sleeve means to hold the sleeve means in the coupling means by engagement with the enlarged ring; and
   (c) a non-flammable J-pipe means removable secured to the extension at a lower most of the openings of the sleeve means by a connection means, wherein in use the J-pipe means is filled with water in a lower portion of the J-pipe means thereby preventing smoke and fire from below the floor from moving up through the coupling means and sleeve means to above the floor.

2. The trap fitting assembly of claim 1 wherein the coupling means is adapted to be cast in place in a poured concrete floor.

3. The trap assembly of claim 1 wherein the spacer tube means and coupling means are composed of plastics which are solvent welded or bonded together.

4. The trap fitting assembly of claim 1 wherein a flexible joint means joins the extension and the J-pipe means together and wherein clamp means secure the joint means to the extension and to the J-pipe means.

5. The trap fitting assembly of claim 1 wherein a drain is attached to the coupling at an uppermost of the ends of the coupling means 6. The trap fitting -assembly of claim 1 wherein tub connecting pipes for an overflow and for a drain are mounted to a common pipe which is mounted at an uppermost of the ends of the coupling means.

7. The trap fitting assembly of claim 6 wherein the common pipe is mounted in the coupling by means of a flexible connector means which mounts around the common pipe and which extends into the coupling and press fits into the coupling means to provide a fluid tight connection between the pipe means and the coupling means.

8. The trap fitting assembly of claim 7 wherein a tub box is mounted in the floor so as to recess the drain pipe to be partially below the upper level of the floor.

9. The trap fitting assembly of claim 1 wherein the sleeve means has an enlarged ring above an elongate cylindrical portion on an outside wall around the longitudinal axis of the coupling means and wherein a non-flammable spacer tube means is mounted in the inside wall of the coupling means and on the elongate cylindrical portion of the sleeve means to hold the sleeve means in the coupling means, wherein a flexible joint means joins the extension and the J-pipe means together and wherein clamp means secure the joint means to the extension means and to the J-pipe means.

10. A building construction which prevents the spread of fires and smoke through a floor of the building which comprises:
   (a) an improved trap fitting assembly which prevents the spread of fire and smoke through a floor of a building through the fitting assembly which comprises: a flammable tubular coupling means having opposed ends which provides an opening along a longitudinal axis through the floor with an outside wall secured to the floor and an inside wall which defines the opening; a non-flammable, thin sleeve means with openings at opposed ends mounted on the inside of the coupling means along the axis between an upper and a lower plane of the floor and with an extension below the lower plane of the floor and with a thickness between inner and outer walls of the sleeve means of less than a thickness between the walls of the coupling means, wherein the sleeve means has an enlarged ring above an elongate cylindrical portion on an outside wall around the longitudinal axis of the coupling means and wherein a thin flammable spacer tube means is mounted on the inside wall of the coupling means and on the elongate cylindrical portion of the sleeve means to hold the sleeve means in the coupling means by engagement with the enlarged ring; and a non-flammable J-pipe means removably secured to the extension at a lower most of the openings of the sleeve means by a connection means wherein in use the J-pipe means is filled with water in a lower portion of the J-pipe means thereby preventing smoke and fire from below the floor from moving up through the coupling means and sleeve means to above the floor;

(b) a floor mounting the coupling means of the fitting through the floor; and (c) a drain pipe connected to the J-pipe means to convey the water overflowing from the J-pipe means through the building.

11. The building construction of claim 10 wherein the coupling means is adapted to be cast in place in a poured concrete floor.

12. The building construction of claim 10 wherein the spacer tube means and coupling means are composed of plastics which are solvent welded together.

13. The building construction of claim 10 wherein a flexible joint means joins the extension adjacent a lower most one of the openings and the J-pipe means together and wherein clamp means secure the joint means to the extension and to the J-pipe means.

14. The building construction of claim 10 wherein a drain is attached to the coupling means at an uppermost of the ends of the coupling means.

15. The building construction of claim 10 wherein tub connecting pipes for an overflow and for a drain are mounted to a common pipe which is mounted at an uppermost of the ends of the coupling means.

16. The building construction of claim 10 wherein the common pipe is mounted in the coupling by means of a flexible connector means which mounts around the common pipe which extends into the coupling means and press fits into the coupling means to provide a fluid and smoke tight connection between the pipe and the coupling means.

17. The building construction of claim 16 wherein a tub box is mounted in the floor so as to recess the drain pipe to the partially below the upper plane of the floor.

18. The building construction of claim 10 wherein the sleeve means has an enlarged ring above an elongate cylindrical portion on an outside wall around the longitudinal axis of the coupling means and wherein a flammable spacer tube means is mounted in the inside wall of the coupling means by engagement with the enlarged ring and on the elongate cylindrical portion of the sleeve means to hold the sleeve means in the coupling means wherein a flexible joint means joins the extension adjacent a lowermost one of the openings and the J-pipe means together and wherein clamp means secure the joint means to the extension means and to the J-pipe means.

* * * * *

UNITED STATES PATENT AND TRADEMARK OFFICE
CERTIFICATE OF CORRECTION

PATENT NO. : 4,953,235

DATED : September 4, 1990

INVENTOR(S) : Kenneth R. Cornwall

It is certified that error appears in the above-identified patent and that said Letters Patent is hereby corrected as shown below:

Column 2, line 47, after "assembly" delete --is--.

Column 3, line 17 "champs" should be --clamps--.

Column 3, line 47, after "level" a period --.-- should be inserted.

Column 3, line 59 (Claim 1) "tubuler" should be --tubular--.

Column 6, line 22 (Claim 17) "the" (first occurrence) should be --be--.

Signed and Sealed this

Eighteenth Day of February, 1992

Attest:

HARRY F. MANBECK, JR.

Attesting Officer

Commissioner of Patents and Trademarks